United States Patent
Cottevieille

(12) 
(10) Patent No.: US 6,303,671 B1
(45) Date of Patent: Oct. 16, 2001

(54) POLYANILINES HAVING MAGNETIC AND ELECTRICAL PROPERTIES, AND A METHOD OF MANUFACTURE

(75) Inventor: Denis Cottevieille, Montreuil sous Bois (FR)

(73) Assignee: NWXANS, Paris (FR)

( * ) Notice: Subject to any disclaimer, the term of this patent is extended or adjusted under 35 U.S.C. 154(b) by 0 days.

(21) Appl. No.: 09/414,421

(22) Filed: Oct. 7, 1999

(30) Foreign Application Priority Data

Oct. 12, 1998 (FR) .................................................. 98 12735

(51) Int. Cl.⁷ ....................................................... G21F 1/10
(52) U.S. Cl. ............................................................. 523/137
(58) Field of Search ............................................. 523/137

(56) References Cited

FOREIGN PATENT DOCUMENTS 0 545 819    6/1993    (EP) .

OTHER PUBLICATIONS

DATABASE WPI, Section CH, Week 8919, Derwent Publications Ltd., London, GB corresponding to JP01086503 A (Mitsui Mining & Smelting Co) Mar. 31, 1989.

*Primary Examiner*—Edward J. Cain
(74) *Attorney, Agent, or Firm*—Sughrue, Mion, Zinn, Macpeak & Seas, PLLC

(57) ABSTRACT

The invention provides a method of manufacturing polyaniline having magnetic properties and improved non-linear electrical properties, starting from neutral polyaniline, the method comprising the following steps: the neutral polyaniline is dissolved at a concentration of 0.1 to 3 parts per hundred by weight in a solution of fuming sulfuric acid including, at a concentration lying in the range 0.1 to 10 parts per hundred by weight, a magnetic metal, a magnetic metal salt, or any mixture of such metals and/or metal salts that is soluble in fuming sulfuric acid; the solution is maintained under stirring for a length of time lying in the range 10 minutes to 72 hours; the solution is poured slowly into methanol or distilled water to obtain a precipitate of magnetic self-doped polyaniline; and the precipitation cake is washed until the washing solution has neutral pH, and said precipitation cake is dried.

7 Claims, No Drawings

POLYANILINES HAVING MAGNETIC AND ELECTRICAL PROPERTIES, AND A METHOD OF MANUFACTURE

The present invention relates to polyanilines and to derivatives thereto possessing magnetic and improved non-linear electrical properties. The invention also relates to a method of preparing such compounds.

BACKGROUND OF THE INVENTION

Various intrinsically-conductive polymers already exist that possess non-linear properties when exposed to an electric field. Numerous prior art patents disclose such compounds, for example French patent No. 96/10963 in the name of the Applicant.

Copolymers possessing ferromagnetic properties have been developed by the Applicant in European patent EP-A-0 545 819. Those copolymers comprise amino-aromatic groups based on a structural unit comprising a first group of amino-aromatic compounds chosen from aniline derivatives and the corresponding iminoquinone forms; and a second group of substituted amino-aromatic compounds chosen from substituted amino compounds containing at least two condensed benzene rings, substituted polycyclic compounds containing at least one aniline structural unit in their structure, compounds derived from aniline and carrying a substituent bonded to the ring by means of an ethynylidene or paraphenylene link, and the corresponding immuno-quinone compounds. Nevertheless, those compounds do not possess sufficient magnetic and electrical properties simultaneously.

The person skilled in the art already knows means for synthesizing polyaniline in order to obtain improved non-linear ferromagnetic properties and electrical properties. For example, it is known to dissolve the polyaniline in its neutral form in N methyl pyrrolidone (NMP) and to react the solution with an aqueous iron sulfate solution, and then to re-dope it by the action of hydrochloric acid. That method thus comprises a plurality of distinct steps. The method of the invention makes it possible in a single step to synthesize a polyaniline having both magnetic properties and improved non-linear electrical properties.

The resulting compound can be used in cables for use in the telecommunications field. Such cables are coaxial in structure and are made up of a metal core surrounded by at least two layers, one of which is a layer of dielectric material including the material of the invention and intrinsically filtering the electromagnetic disturbances they convey. The use of the material of the invention makes it possible to provide better matching for the cutoff frequency of filtering cables. This is particularly advantageous for filtering cables of short length.

OBJECTS AND SUMMARY OF THE INVENTION

The method of the invention for manufacturing self-doped polyaniline from neutral polyaniline comprises the following steps:

the neutral polyaniline is dissolved at a concentration of 0.1 to 3 parts per hundred by weight in a solution of fuming sulfuric acid including, at a concentration lying in the range 0.1 to 10 parts per hundred by weight and preferably 2 to 10 parts per hundred by weight, a magnetic metal, a magnetic metal salt, or any mixture of such metals and/or metal salts that is soluble in fuming sulfuric acid;

the solution is maintained under stirring for a length of time lying in the range 10 minutes to 72 hours, advantageously for 2 hours;

the solution is poured slowly into methanol or distilled water to obtain a precipitate of magnetic self-doped polyaniline; and the precipitation cake is washed until the washing solution has neutral pH, and said precipitation cake is dried.

In a particular variant, the metal element is incorporated by means of a metal element that is paramagnetic, and in particular ferromagnetic.

Advantageously, the metal element is incorporated by means of a salt or a mixture of salts that are paramagnetic, and in particular ferromagnetic.

DETAILED DESCRIPTION OF THE INVENTION

The method will be better understood from the following examples that are preferred, but not essential.

The advantages of the present invention stem from two procedures described below. Naturally, the present invention is not limited to these particular implementations, and the person skilled in the art can envisage numerous variants without thereby going beyond the method of the invention.

A first implementation consists in dissolving one gram (g) of de-doped polyaniline in 60 cm$^3$ of fuming sulfuric acid. 430 mg of nickel acetylacetonate are added and the resulting solution is maintained under stirring for 2 hours. The solution obtained in this way is then poured slowly into methanol to obtain a precipitate of magnetic self-doped polyaniline. The precipitation cake is then washed until the washing solution (or filtrate) has neutral pH. The resulting product is then dried for 72 hours at 60° C. 1.2 g of dry product are thus obtained. Measurement of the elements contained gives the following results as to composition in terms of elements: 11% nitrogen, 5.1% sulfur, and 0.15% nickel.

A second advantageous implementation consists in dissolving 1 gram of de-doped polyaniline in 50 cm$^3$ of fuming sulfuric acid. 500 mg of hydrated iron sulfate are added and the resulting solution is maintained under stirring for 2 hours. The solution then obtained is poured slowly into methanol to obtain a precipitate of magnetic self-doped polyaniline. The precipitation cake is then washed until the washing solution (or filtrate) has neutral pH. The resulting product is then dried for 72 hours at 60° C. This provides 1.35 g of dry product. Measurement of the elements contained therein gives the following results as to composition in terms of elements: 11% nitrogen, 5% sulfur, and 0.6% nickel.

What is claimed is:

1. A method of manufacturing polyaniline having magnetic properties and improved non-linear electrical properties, starting from neutral polyaniline, the method comprising the following steps:

the neutral polyaniline is dissolved at a concentration of 0.1 to 3 parts per hundred by weight in a solution of fuming sulfuric acid including, at a concentration lying in the range 0.1 to 10 parts per hundred by weight, a magnetic metal, a magnetic metal salt, or any mixture of such metals and/or metal salts that is soluble in fuming sulfuric acid;

the solution is maintained under stirring for a length of time lying in the range 10 minutes to 72 hours;

the solution is poured slowly into methanol or distilled water to obtain a precipitate of magnetic self-doped polyaniline; and the precipitation cake is washed until the washing solution has neutral pH, and said precipitation cake is dried.

2. A method of manufacturing polyaniline having magnetic properties and improved non-linear electrical properties starting from neutral polyaniline, according to claim 1, wherein the metal element is incorporated by means of a paramagnetic metal element.

3. A method of manufacturing polyaniline having magnetic properties and improved non-linear electrical properties starting from neutral polyaniline, according to claim 1, wherein the metal element is incorporated by means of a ferromagnetic metal element.

4. A method of manufacturing polyaniline having magnetic properties and improved non-linear electrical properties starting from neutral polyaniline, according to claim 1, wherein the metal element is incorporated by means of a paramagnetic salt or a mixture of paramagnetic salts.

5. A method of manufacturing polyaniline having magnetic properties and improved non-linear electrical properties starting from neutral polyaniline, according to claim 1, wherein the metal element is incorporated by means of a ferromagnetic salt or a mixture of ferromagnetic salts.

6. A method of manufacturing polyaniline having magnetic properties and improved non-linear electrical properties starting from neutral polyaniline, according to claim 1, wherein the metal element is incorporated by means of a hydrated iron sulfate.

7. A method of manufacturing polyaniline having magnetic properties and improved non-linear electrical properties starting from neutral polyaniline, according to claim 1, wherein the metal element is incorporated by means of nickel acetylacetonate.

* * * * *